United States Patent [19]

Bosshart

[11] Patent Number: 4,991,081
[45] Date of Patent: Feb. 5, 1991

[54] CACHE MEMORY ADDRESSABLE BY BOTH PHYSICAL AND VIRTUAL ADDRESSES

[75] Inventor: Patrick W. Bosshart, Dallas, Tex.

[73] Assignee: Texas Instruments Incorporated, Dallas, Tex.

[21] Appl. No.: 368,140

[22] Filed: Jun. 16, 1989

Related U.S. Application Data

[63] Continuation of Ser. No. 89,032, Aug. 24, 1987, abandoned, which is a continuation of Ser. No. 666,853, Oct. 31, 1984, abandoned.

[51] Int. Cl.$^5$ .............................................. G06F 12/08
[52] U.S. Cl. .............................. 364/200; 364/243.41; 364/256.3
[58] Field of Search ... 364/200 MS File, 900 MS File

[56] References Cited

U.S. PATENT DOCUMENTS

| | | | |
|---|---|---|---|
| 3,693,165 | 9/1972 | Reiley et al. | 364/200 |
| 3,723,976 | 3/1973 | Alvarez | 364/200 |
| 3,761,881 | 9/1973 | Anderson et al. | 364/200 |
| 3,829,840 | 8/1974 | Burk et al. | 364/200 |
| 4,322,815 | 3/1982 | Broughton | 364/900 |
| 4,453,230 | 6/1984 | Mizoguchi et al. | 364/900 |
| 4,464,712 | 8/1984 | Fletcher | 364/200 |
| 4,580,240 | 4/1986 | Watanabe | 364/200 |
| 4,587,610 | 5/1986 | Rodman | 364/200 |
| 4,602,368 | 1/1986 | Circello et al. | 364/900 |
| 4,612,612 | 9/1986 | Woffinden | 364/200 |
| 4,631,660 | 12/1986 | Woffinden | 364/200 |
| 4,654,790 | 3/1987 | Woffinden | 364/200 |

OTHER PUBLICATIONS

*Computer Systems Architecture*, by Jean-Loup Baer, copyright 1980, pp. 300-306.
*Digital Integrated Electronics*, by Taub, et al., pp. 68-71, 92-95, 154-155, copyrighted 1977.

*Primary Examiner*—Lawrence E. Anderson
*Attorney, Agent, or Firm*—James C. Kesterson; James T. Comfort; Melvin Sharp

[57] ABSTRACT

A cache memory addressable by both physical and virtual addresses includes a cach data memory (64) and a tag memory (66). The tag memory (66) is comprised of a virtual tag memory (68) and a physical tag memory (70). The physical and virtual tag memories are both addressable by the least significant bits (LSB) of the address signal to output tag portions of addresses associated with data stored in the cache data memory (64). A switch (78) selects between the outputs from the memories (68) and (70) under control of an arbitration unit (88). The arbitration unit (88) distinguishes between virtual or physical addresses input thereto. A comparator (100) compares the selected tag portion with the tag portion of the received address to determine if a match exists. If a match exists, the output of the cache data memory is selected with a switch (84).

9 Claims, 3 Drawing Sheets

CACHE MEMORY ADDRESSABLE BY BOTH PHYSICAL AND VIRTUAL ADDRESSES

This application is a Continuation, of application Ser. No. 07/089,023, now abandoned, filed Aug. 24, 1987 which is a continuation of U.S. Pat. No. 666,853 filed Oct. 31, 1984, now abandoned.

TECHNICAL FIELD OF THE INVENTION

The present invention pertains in general to cache memories and, more particularly, to the addressability of the cache by both a physical address and a virtual address.

BACKGROUND OF THE INVENTION

Cache memory systems have been utilized in modern computer systems to enable the system to operate at a much higher rate of execution with the large capacities that main memories can support. The cache memory stores a limited number of instruction or data words that are readily accessed by a central processing unit. During acquisition of data or instructions from memory, the cache is first examined to determine if the information is available therein. If the information is stored therein, it will be read from cache memory; otherwise, it will be read from main memory. When the information must be read from main memory, this new information is then stored in the cache memory and replaces already existing information therein. To determine the information in the cache that is to be replaced, a determination is made as to which data or instructions stored in the cache memory have been least recently accessed or "least recently used". By so doing, data or instructions that are most commonly used will statistically be available in the cache memory, thereby increasing execution speed of a given system.

In utilizing a least recently used system, it is necessary to determine priority between the various registers in a given cache memory. There are various methods that have been utilized in the past for accomplishing this, such as that disclosed in U.S. Pat. No. 4,458,310, issued to Shih-Jeh Chang and assigned to AT&T Bell Laboratories. Essentially, it is necessary to utilize additional memory for the storage of information corresponding to the priority of the various data registers. This is facilitated by pointers or the like. However, implementation of least recently used systems has proven to be difficult and requires a large amount of circuitry and time consuming processing techniques.

In addition to determining the priority of a given memory location in a cache, the addressing of cache memory also presents a problem when utilized in a system of multiple processors with multiple caches. In a system of this form, the main memory and caches operate in a physical addressing medium, whereas the multiple processors operate in a virtual addressing medium. Therefore, a processor must make a translation from virtual to physical addressing in order to access its associated cache. This presents a disadvantage in that a predetermined amount of processing time is required to perform this translation, which can decrease execution speed. Therefore, it would be desirous to have a cache memory which recognizes both the virtual and physical addresses such that either type of address can be directly utilized with a cache memory, thereby eliminating the virtual to physical translation time.

In fabricating cache memories, it is necessary that all accessible memory locations be operable such that errors are not introduced when the memory is incorporated into a system. Although a defective location may be tolerated in an N-way associative set, it is first necessary to deactivate this defective location such that an attempt is not made to store data therein or read data therefrom. This has been facilitated in the prior art by determining which data register is defective upon power up of a system and storing this information in a memory. Circuitry is then utilized to inhibit access to the faulty portion of the cache memory. A system of this type is described in *Architecture of a VLSI Instruction Cache for a RISC*, Patterson et. al., 10th International Symposium on COMPUTER ARCHITECTURE, Jun. 13-16, 1983. However, this requires complicated circuitry and scanning of the system prior to activation of the system.

In view of the above disadvantages, there exists a need for an architecture which allows a system to directly communicate with a cache through both physical or virtual addresses and also to determine which data register in a given cache is the least recently accessed data in a reliable and efficient manner.

SUMMARY OF THE INVENTION

The present invention disclosed and claimed herein comprises a cache memory that is addressable by both virtual and physical addresses. The addresses for addressing data in the cache memory are divided into an LSB portion and a tag portion, the LSB portion being comprised of a predetermined number of least significant bits and the MSB portion being comprised of the remaining or most significant bits. The LSB portion of both the physical and virtual addresses are common for all addressed data. A cache data memory is provided for storing select data, the select data having virtual and physical addresses associated therewith. The cache data memory is addressable by the LSB portion of the received address for output of the addressed data stored at the address location. A tag memory is provided that is comprised of a virtual tag memory and a physical tag memory. The virtual tag memory stores the tag portions of the virtual addresses associated with the data stored in the cache data memory and the physical tag memory stores the tag portion of the physical address associated with the data stored in the cache data memory. The physical and virtual tag memories are addressable by the LSB portion of the received address. An arbitration unit is provided for determining whether the received address is virtual or physical and a control signal is generated corresponding to this determination. A multiplexer is connected to the output of the virtual and physical tag memories and controlled by the arbitration unit to select the corresponding one of the tag memories to output either the virtual or the physical tag portion. A comparator compares the selected virtual or physical tag portion with the received tag portion to determine if a match exists. If a match exists, an output switch is controlled to output the addressed data from the cache data memory.

In another embodiment of the present invention, the virtual and physical tag portions of the address associated with update data being stored in the cache data memory is selectively stored in the virtual and physical tag memories. The multiplexer circuit is bidirectional and both the virtual and physical tag portions are generated in response to either the virtual or physical address of the update data being input to the arbitration unit. The arbitration unit then controls the multiplexer to store both the physical and virtual tag portions in the appropriate locations in the virtual and physical tag memories, respectively.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
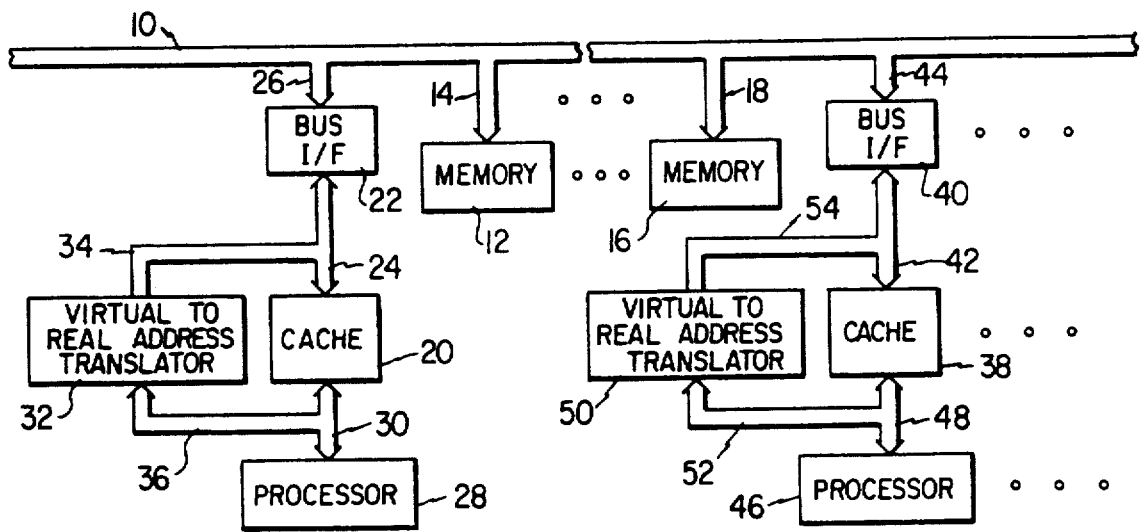
FIG. 1 illustrates a schematic diagram of a multiprocessor system in accordance with the present invention utilizing multiple processors with associated caches.

Referring now to FIG. 1, there is illustrated a block diagram of a computer system utilizing a plurality of microprocessor units with associated caches. The system communicates through a bus 10 which is of the type referred to as NU-bus. This is a 32-bit bus which carries 32-bit physical addresses. However, any type of system bus may be utilized. A memory 12 is connected to the NU-bus 10 through a bus 14 and a memory 16 is also connected to the bus 10 through a connecting bus 18. A plurality of additional memories are illustrated by a series of dotted lines between the memories 12 and 16. Each of the memories 12 and 16 can be any form of mass storage memory requiring a physical address for accessing thereof.

A cache memory 20 is connected to a bus interface 22 through a connecting data bus 24. The bus interface 22 is interconnected with the bus 10 through a connecting bus 26. The cache memory 20 is also connected to a processor 28 through a connecting bus 30. The addresses contained on the interconnecting bus 24 are physical addresses whereas the addresses contained on the interconnecting bus 30 are virtual addresses, as the processor 28 interfaces with virtual addresses only.

A virtual to real address translator (V/R translator) 32 has the real input thereof connected to the connecting bus 24 through a connecting bus 34 and the virtual input thereof connected to the connecting bus 30 through a connecting bus 36. The V/R translator 32 enables the processor 28 to communicate with the data bus 10 through the bus interface circuit 22.

In operation, a virtual address output by the processor 28 is directly processed by the cache 20 and compared therewith to determine if data is stored therein. If the cache memory 20 is addressed from the bus 10, a physical address is input to the cache memory 20 on the connecting bus 24 and a determination is made as to whether this data is stored in the cache memory 20. Therefore, it is not necessary to go through a virtual to real address translation prior to addressing the cache memory 20 from the processor 28. This reduces the amount of processing time since the cache 20 is normally addressed prior to addressing the main memory.

Although the V/R translator 32 is not necessary for addressing the cache 20, it is still required to allow the processor 28 to directly send physical addresses to the bus 10. This is utilized when the cache memory 20 is not being addressed, such as when other peripheral operations are performed by the processor 28.

A second cache memory 38 is connected to a bus interface circuit 40 through a connecting bus 42 for interface with the bus 10 through a connecting bus 44. The cache memory 38 is also interconnected with a processor 46 through a connecting bus 48, the processor 46 being similar to the processor 28. A V/R translator 50 has the virtual input thereof connected to the connecting bus 48 through a connecting bus 52 and the real output thereof connected to the connecting bus 42 through a connecting bus 54 for sending physical addresses thereto. The V/R translator 50 is similar to the V/R translator 32, both of which utilize conventional circuitry for the implementation thereof.

The system of FIG. 1 can comprise any number of main memories and any number of processors with associated caches. When a system of this size operates, the cache memories 20 and 38 store data which is utilized most often from a statistical standpoint. Therefore, when data is accessed from the main memories 12 or 16, it is stored in the respective cache for later use. Thereafter, an address that is placed on a bus for retrieval of data and/or instructions is first input to the associated cache memory to determine if the data is stored therein. If not, the data is retrieved from main memory for use by the processor that generated the address and this data is also stored in the associated cache memory. In storing this data, the least recently used data register in the cache memory is written over.

When data is read, a problem arises in that the data may be contained in both the opposite cache memory and the main memory. Therefore, some algorithm must be utilized to ensure that correct data is being accessed. This normally involves examining the contents of all the caches in the system. For example, if the processor 28 reads data from the bus 10, it is necessary to determine if the data being read is stored in the cache 38. This requires the cache memories 20 and 38 to respond to physical addresses to insure system data integrity. However, the cache memories are also directly addressed by the associated one of the processors 28 or 46, which utilize virtual addressing. In order to increase system performance, a cache memory is utilized which directly interfaces with either a virtual or a physical address without the use of a V/R translator.

Figure 2:
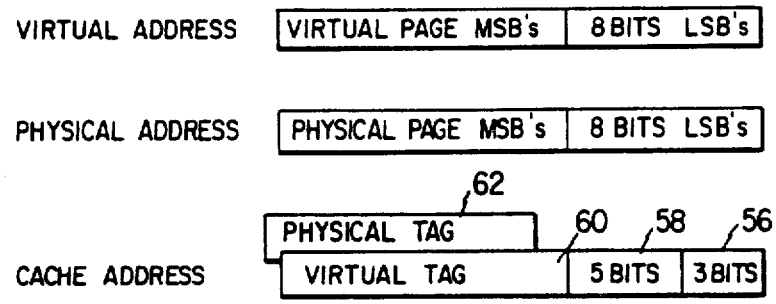
FIG. 2 illustrates the mapping of the virtual and physical addresses in the tag memory for a given cache.

Referring now to FIG. 2, there is illustrated a schematic representation of the virtual and physical addresses and the format of a cache addressing system for direct addressing by these addresses. A virtual address can have any number of bits which are arranged in fields, according to the predetermined pattern. In addition, the physical address can also be arranged in a predetermined order. The data is arranged in "pages" which are units of memory. This allows for mapping of the various locations in memory to other locations in memory. The first eight bits of the address define the location within a page in both virtual and physical memory. By utilizing a common scheme, they can be directly mapped into each other. For example, eight bits results in 256 words per page of memory. However, it should be understood that other page sizes may be utilized. The eight bits which define the page length are the least significant bits "LSBs" of the address. The most significant bit (MSBs) make up the remainder of the address. The MSBs of the physical and virtual addresses do not have to be identical in length since the virtual memory may have a larger capacity although some systems have relatively smaller virtual addresses. The number of pages is determined by the MSBs of the address.

In conventional cache memories, the address is divided up into the eight bit LSB field and the remaining MSB field. The eight bit LSB field is divided into a three bit field 56 and a five bit field 58. The two fields 56 and 58 define blocks of cache memory with each block divided into a predetermined number of storage locations. The five bit field 58 corresponds to the blocks within the cache memory and defines 32 separate blocks whereas the three bit field 56 corresponds to the individual registers in a given block and defines eight memory locations in each of the blocks. Each of these locations in the given block is for storage of data.

In the cache address, the MSB portion is divided into two types, a first type 60 which is defined as the virtual tag and the second type 62 which is defined as the physical tag. Each of the types 60 and 62 occupy the same portion of the cache address; that is, the MSBs of the cache address are either received from a virtual or a physical addressing unit. As will be described hereinbelow with reference to FIG. 3, the MSBs of the cache address present in the data portion of a cache memory are stored in the tag memory which is divided into 32 separate memory locations.

Figure 3:
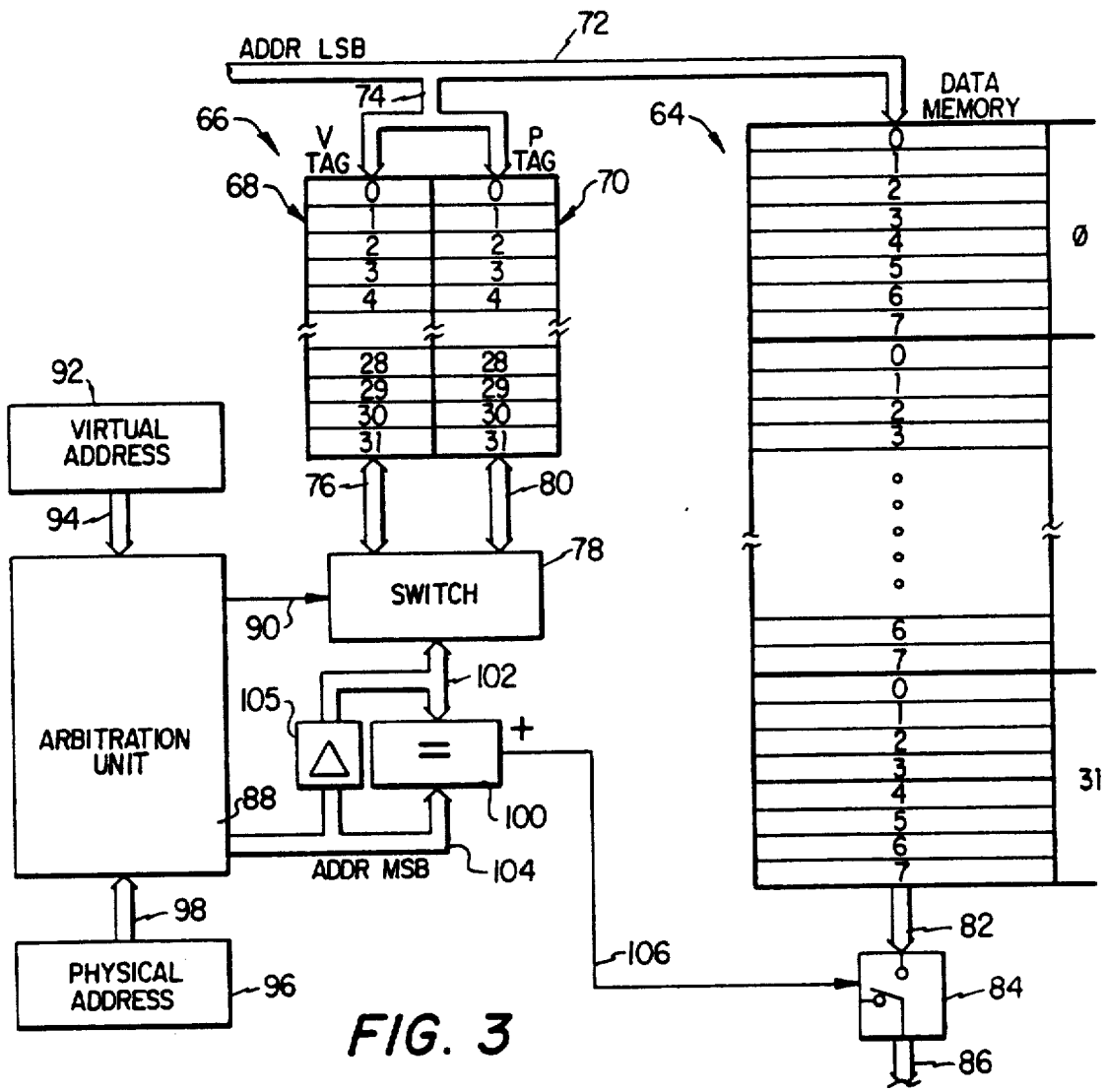
FIG. 3 illustrates the tag and data memory of a cache for recognizing both virtual and physical addresses.

Referring now to FIG. 3, there is illustrated a schematic block diagram of the cache memories 20 and 38 of FIG. 1. Each of the cache memories is divided into a data memory 64 and a tag memory 66. The data memory is divided into 32 blocks labeled from "0" to "31". Each of the blocks is divided into eight separate memory locations labeled "0" through "7". Therefore, the data memory 64 contains 256 words of data for storing up to one page of memory. However, the data contained in the data memory 64 does not necessarily correspond to one distinct page of memory but, rather, each block in the data memory 64 can correspond to an eight word block from any page of memory. The location within the data memory 64 depends only upon the eight LSBs. As will be described hereinbelow, the MSB stored in the tag memory 66 corresponds to only one data word in the data memory 64. However, all the data associated therewith is stored in the same block of the data memory, as defined by the three bit segment 56.

The tag memory 66 is divided into two distinct memories, a virtual tag memory 68 and a physical tag memory 70. Both of the memories 68 and 70 have 32 memory locations labeled from "0" to "31". The width of the memory is equal to the width of the MSBs in either the physical tag portion 62 or the virtual tag portion 60. For example, if the physical address were 32 bits long, the MSB would be 24 bits long and, consequently, the physical tag memory 70 would be 24 bits wide. The virtual tag memory 68, on the other hand, could have a different length, depending upon the length of the MSBs therein.

Each of the MSBs stored in the tag memory 66 corresponds to the MSBs of a given physical or virtual address. The location depends upon the five bit field 58 which, in turn, corresponds to a block of the data memory 64. Therefore, the five bit field 58 determines which block of the data memory that corresponding data is stored in and which location in the tag memory 66 the MSBs of the tag are stored. In addition, the three bit field 56 of the address determines in which of the eight locations in a given block data corresponding to that address is stored.

To address both the data memory 64 and the tag memory 66, the LSBs of the cache address are extracted from the cache address and placed on an LSB address bus 72. The five bit field 58 of the cache address is extracted from the LSB bus 72 and placed on a five bit bus 74 which is branched for input to both the virtual tag memory 68 and the physical tag memory 70 to provide an address therefor. The output of the virtual tag memory 68 is output on a bus 76 for input to a switch 78 and the physical tag memory 70 is output on a bus 80 for input to the remaining input of the switch 78. The switch 78 selects between the outputs of the two memories 68 and 70.

The data memory 64 is addressed through the eight LSBs making up the fields 56 and 58 of the cache address, these bits received from the LSB address bus 72. For each of the LSB addresses, one of the 256 locations in the data memory 64 is selected and output on a data bus 82 for input to a switch 84. The switch 84 is a normally open switch with its output connected to a bus 86 for output to the remainder of the system.

The switch 78 is controlled by an arbitration unit 88 which outputs a control signal on a control line 90 for input to the control input of the switch 78. The arbitration unit 88 has two inputs, one of which is connected to a virtual address mechanism 92 through a bus 94 and the other input thereof connected to a physical address mechanism 96 through a bus 98. The arbitration unit 88 is operable to distinguish between the virtual address and the physical address to select which of the tag memories 68 or 70 is to be selected.

The output of the switch 78 is input to a comparison circuit 100 through a bus 102. The comparison circuit has the other input thereof connected to an MSB address bus 104 which carries the MSBs of the cache address for either the virtual address or the physical address, as represented by the portions 60 and 62 in FIG. 2. The address bus 104 is connected to the output of the arbitration unit 88. The address bus 104 is also connected to the connecting bus 102 to allow input of address data to the switch 78. The comparator 100 compares the MSBs between the address supplied by the virtual address unit 92 or the physical address unit 96 with the MSBs stored in the tag memory 66. If a good comparison is made, a signal is output on a control line 106 to control the switch 84 to output data from the bus 82 to the bus 86. For example, if a virtual address is input to the arbitration unit 88, the switch 78 selects the output bus 76. For an address in which the five bit section 58 corresponds to a logic "4", the memory location labeled "4" is selected from the virtual tag memory 68 for output on the bus 102. Simultaneously therewith, the data memory receives the eight LSBs of the address and outputs one of the 256 data words therefrom to the data bus 82. If the address MSBs stored in the location "4" of the virtual tag memory 68 correspond to the MSBs supplied from the virtual address unit 92, the comparator 100 outputs a control signal on the line 106 to connect the data on the data bus 82 to the data bus 86 for forwarding to the rest of the system. However, if a match is not found, a "Miss" is indicated elsewhere in the system and the data is retrieved from main memory for use by the addressing unit and, in addition, the MSBs of that address are written into the tag memory 66 and the associated data therewith written into the data memory 64. However, caches arranged in an N-way associative set will require some type of priority indicator to determine the storage location, as will be described hereinbelow. In order to write data to the tag memories 68 and 70, MSB data is input on the bus 102 and the switch 78 selects the appropriate one of the memories 68 or 70 in response to the arbitration unit 88. The arbitration unit 88 is operable to write both the MSB portion of the physical address and the MSB portion of the virtual address into the respective tag memory 70 or 68 through the switch 78.

Figure 4:
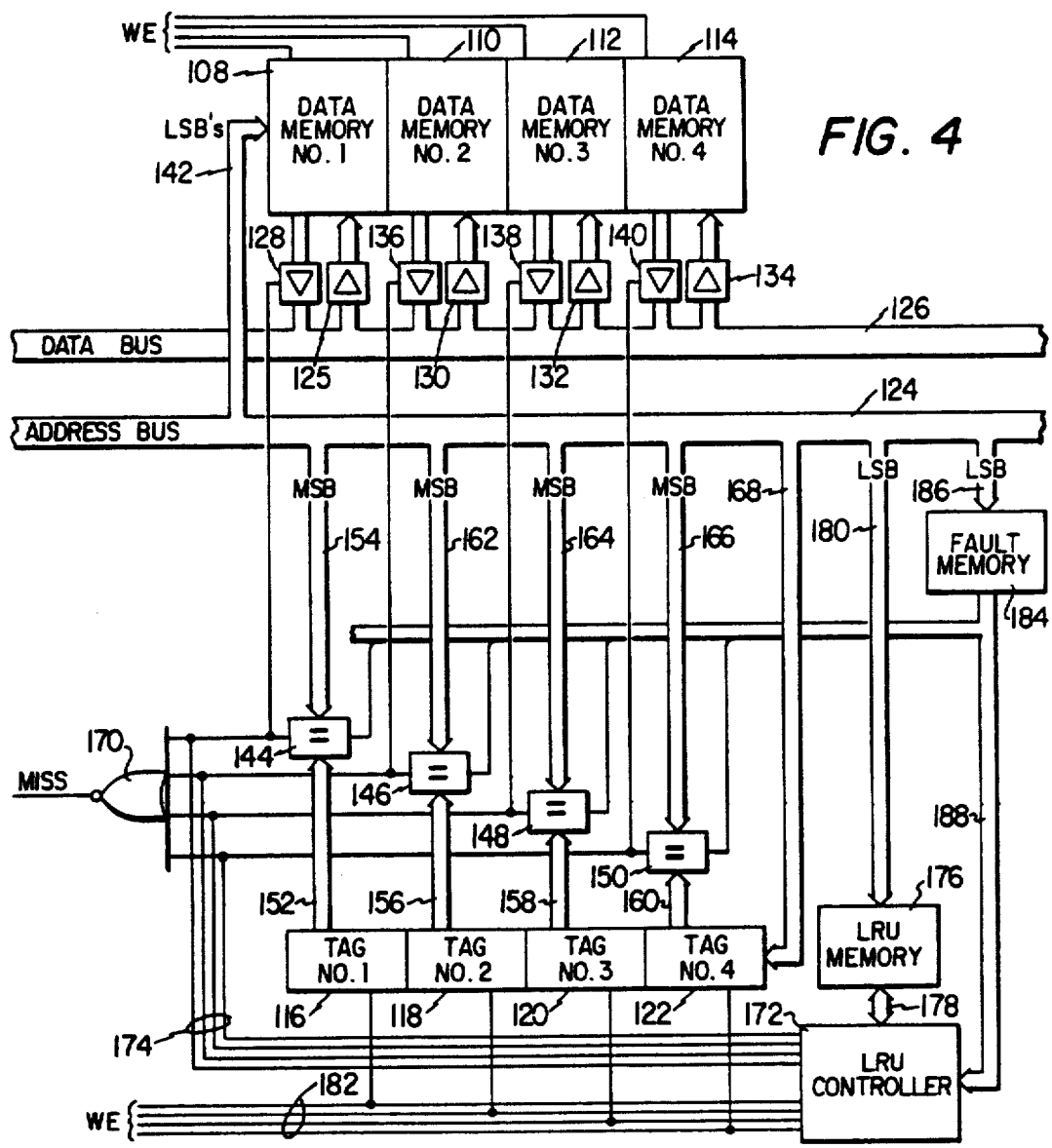
FIG. 4 illustrates a schematic block diagram of an associative set of caches.

Referring now to FIG. 4, there is illustrated a schematic block diagram of a four-way set-associative cache memory with associated circuitry for determining the least recently used data position therein. For simplicity purposes, the circuitry for distinguishing between virtual and physical addresses described above is not included. The data memory is comprised of four data memories 108, 110, 112 and 114 and the tag memory is comprised of four tag memories 116, 118, 120 and 122. Each of the data memories 108-114 is associated with one of the tag memories 116-122 and they are labeled with the numerals "1", "2", "3", and "4", respectively.

Addresses for the cache memory are carried on an address bus 124 and data is carried on a data bus 126. The data bus 126 is connected to the data memory 108 through a line driver 125 for reading data into the memory 108 and to the data memory 108 through a line driver 128 for receiving data therefrom. In a similar manner, data is read from the data bus to the data memories 110, 112 and 114 through line drivers 130, 132 and 134, respectively. Data is read from the memories 110, 112 and 114 to the data bus 126 through line drivers 136, 138 and 140, respectively. The address for the data memories 108-114, as described above, is comprised of the eight LSBs from the address bus 124 which is received on the address input through an LSB data bus 142. Data is written to and read from the memories 108-114 in the conventional manner for that utilized in cache memories.

The tag memories 116, 118, 120 and 122 are associated with comparators 144, 146, 148 and 150, respectively. Each of the comparators 144-150 has two inputs, one of which is connected to the associated one of the tag memories 116-120 and the other of which is connected to the MSBs of the address on the address bus 124. The comparator 144 is associated with the tag memory 116 through a data bus 152 and with the address bus 124 through an MSB data bus 154. In a similar manner, the comparators 146, 148 and 150 are connected to the associated tag memories 118, 120 and 122, respectively, through data buses 156, 158 and 160, respectively. The other inputs of the comparators 146, 148 and 150 are connected to MSB data buses 162, 164 and 166, respectively. The tag memories 116-122 have the address inputs thereof connected to an LSB data bus 168 which is connected to the most significant five bits of the eight bit LSB section of the cache address. Although not shown, the MSB data buses 154, 162, 164 and 166 are connected to the data inputs of the tag memories 116-122 through buffers to allow data to be written into the tag memories 116-122.

The outputs of the comparators 144-150 are connected to the respective inputs of a four input NOR gate 170. In addition, the outputs of each of the comparators 144-150 are connected to the control inputs of the line drivers 128, 136, 138 and 140, respectively, to enable retrieval of data from the data memories 108-114. The output of the NOR gate 170 determines whether a "Hit" or a "Miss" has been achieved with respect to data in the memory. A "Hit" indicates that the data has been accessed from cache memory and a "Miss" indicates that the data is not stored in the cache memory and must be accessed from main memory. Conventional techniques are utilized to retrieve data from main memory. However, once it has been retrieved, it must be stored in the least recently used memory block of the data memory. As described above, data is retrieved in blocks of eight words corresponding to the least significant bits in the address.

To determine the least recently used block of memory, the outputs of the comparators 144-150 are input to an LRU controller 172 through lines 174. The LRU controller 172 is interfaced with an LRU memory 176 through a bidirectional data bus 178. The LRU memory 176 receives the address therefor from the address bus 124 through a LSB data bus 180, which contains the five most significant bits of the eight bit LSB.

When data has been addressed that is not stored in the data memories 108-114, it must be accessed from main memory and also "cached". In caching data, the LRU controller 172 first examines the LRU memory 176 to determine which of the data memories 108-114 has been least recently used for a given eight bit LSB portion of an address. Once this is determined, a signal is output on lines 182 to the data memories 108-114 and the tag memories 116-122. These are labeled WE for Write-/Enable. The circuitry for writing data into a given data memory and tag memory associated with a cache memory is conventional circuitry.

In addition to receiving data from the LRU memory 176 to determine which of the cache memories is least recently used, the LRU controller 172 also updates the LRU memory 176 for each cache access. However, this presupposes that each memory location within the associative cache memory is valid and therefore capable of reading data therefrom and writing data thereto. If one of the memory locations is faulty, an error may result in either nonaccess of stored data or access of the wrong data. Although the existence of a fault is not detrimental to an N-way associative cache memory, it is necessary to determine which of the memory locations is faulty and prevent data from being written to or read from this memory location. This is facilitated in the present invention by a fault memory 184 which has the address input thereof connected to the address bus 124 through an LSB data bus 186 for receiving the five most significant bits of the eight bit LSB field and the data output therefrom connected to the LRU controller 172 through a data bus 188. The fault memory 184 has contained therein data indicative of the fault status of each of the memory locations of the cache memory such that the LRU controller 172 is inhibited from designating that memory location as the least recently used cache location. In addition, the output of the fault memory 184 is input to each of the comparators 144-150 with one bit thereof connected so as to disable the comparator output. If access is made to a faulty location, the data stored in the fault memory 184 inhibits a "Hit" from being registered.

In the preferred embodiment, the fault memory 184 is preprogrammed at the factory to provide a permanent record of the fault status of all the memory locations within the cache. With the aid of the LRU controller 172, it is therefore possible to control the caching of data in an N-way associative cache memory without using undue processing therefor, as will be described hereinbelow.

Referring further to FIGS. 3 and 4, the operation of the system will be described in more detail. Initially, one of the processors or addressing units delivers either a virtual or physical address to the arbitration unit and also to the address bus 124. The LSBs of the address are then input to the tag memories 116–122 and the appropriate MSBs that are stored therein output to the comparison circuits 144–150. The switch 78 in FIG. 3 determines whether the virtual or physical tag is output to the comparator circuits 144–150. It should be understood that the comparator circuits 144–150 are identical to the comparator circuit 100 of FIG. 3.

Simultaneous with outputting the MSBs from the selected tag location, data is also addressed in the data memories 108–114 and this data output therefrom. Upon a good comparison in any of the comparators 144–150, the appropriate one of the transceivers 128, 136, 138 or 140 is activated by one of the comparators 144, 146, 148 and 150, respectively, and data is output on the data bus 126. In addition, the output of the NOR gate 170 is driven to a logic "low" to register a "Hit".

If the MSBs corresponding to a given eight bit LSB field are not found in the tag memories 116–122, the output of the NOR gate 170 is a logic "high" representing a "Miss". The system then accesses main memory to obtain the desired data residing at that address location. In addition, this data must be written in the cache memory in the appropriate place. Since, as described above, each data word is associated with a block of data, the block being defined by the five bit field 58 in the cache address is retrieved and stored along with the addressed word. For example, if the five bit field 58 is a logic equivalent of the block "31", and the three bit field 56 is the logic equivalent of the fourth segment in the block "31", then all of the data having the same MSBs and the same five bit field 58 are placed into the block "31"; that is, all of the data words surrounding the data word in the fourth segment are placed into block "31". In addition, the associated MSB field of the address is stored in the associated tag memory. The process for storing this data and associated tags into the data memories 108–114 and tag memories 116–122 is conventional. Also, prior to writing over existing cache data, it is examined to determine if associated data contained in main memory must be updated.

Prior to writing data into data memories 108–114, the determination must be made as to which of the data memories contains the least recently used data. This is effected through use of the LRU memory unit 176 and the LRU controller 172. After data has been written, the LRU memory 176 is updated and the next address can be supplied to the cache memory.

Figure 5:
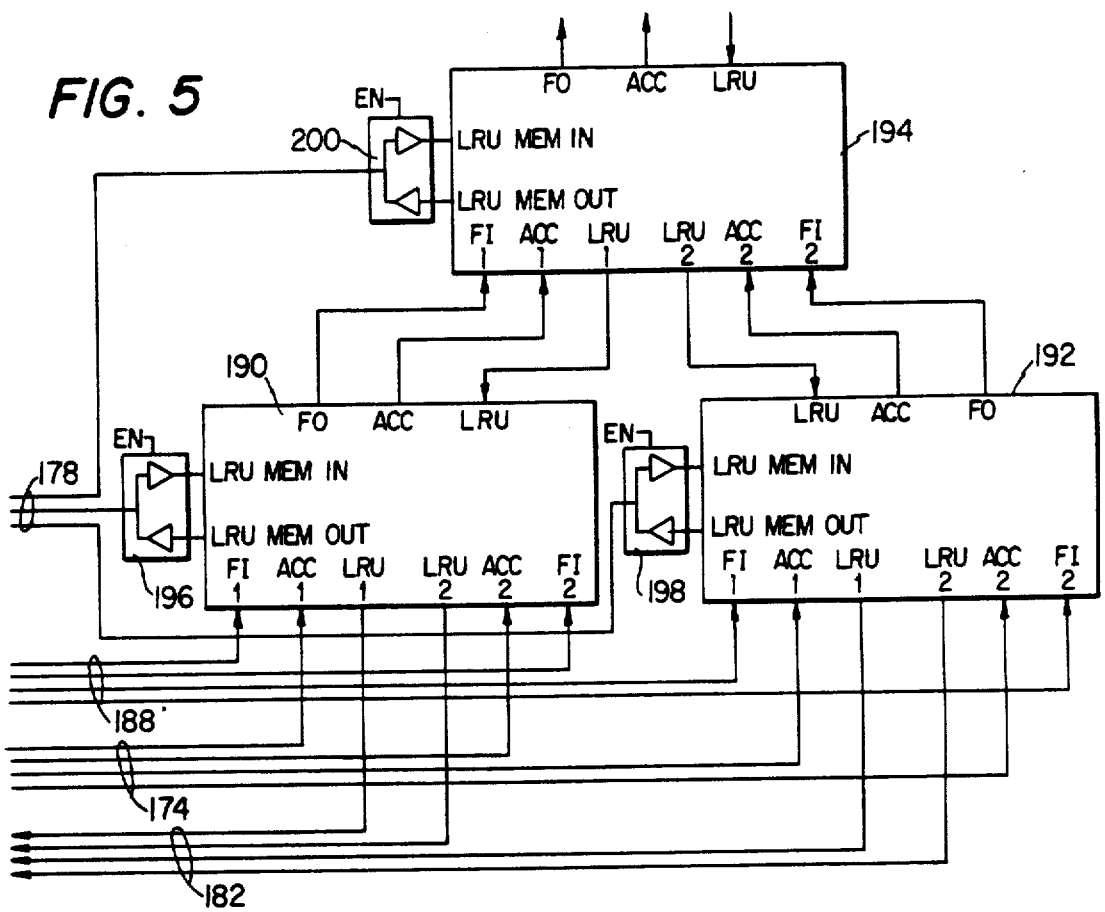
FIG. 5 illustrates a schematic block diagram of the least recently used LRU controller.

Referring now to FIG. 5, there is illustrated a schematic block diagram of the LRU controller 172 which is fabricated in a tree structure with the branches of the tree being connected to each of the individual tag memories and associated comparators. Like numerals refer to like parts in the figures. Two of the cache memories in the associative set are interfaced with a control circuit 190 and the remaining two cache memories are associated with a control circuit 192. The two control circuits 190 and 192 are interfaced with a higher level control circuit 194. This type of structure is a hierarchical architecture which has multiple levels depending upon the number of cache memories in the N-way associative set. If, for example, there were eight separate cache memories in the associative set, then four lower level control circuits would be utilized, two intermediate control circuits would be utilized and one high level circuit for a total of seven. Therefore, for an N-way associative set, there would be N-1 control circuits. Each control circuit would have associated with it one bit of memory to determine which of the branches attached thereto is the least recently used branch such that an N-way associative set would require N-1 bits of memory for each addressable location in the tag memories to determine the least recently used memory location.

Each of the lower order control circuits 190 and 192 receives on the inputs thereof two access signals (ACC) from the lines 174 that are output by the comparators 144–150 and two fault signals (FI) from the fault memory 184. Each of the control circuits 190 and 192 also outputs a LRU signal (LRU) on the lines 182 labeled "WE". In addition, access output signals (ACC) and fault out signals (FO) are also output to the next higher level control circuit 194 in addition to receiving therefrom an LRU signal on an input labeled LRU. The higher level control circuit 194 is identical to the lower level control circuits 190 and 192.

The data bus 178 has a bit line connected to each of the control circuits 190–194 through transceivers 196, 198 and 200, respectively. Each of the transceivers 196–200 has an enable input (EN) for determining whether data is read from the data bus 178 or written to the data bus 178. The outputs of the transceivers 196–200 are connected to inputs labeled LRU MEM IN and LRU MEM OUT.

The least recently used configuration of FIGURE 5 and the architecture thereof facilitates a large number of cache members in an N-way associative set by providing an efficient method of determining the least recently used member. This becomes more critical when cache members that are directly addressable by both virtual and physical addresses are utilized. This is due to the limitations of the size of the individual address relative to a page size. For example, if the page size is 256 words, the physical and virtual addresses will have an eight bit common field. This precludes increasing individual cache members size that requires use of a large N-way associative set.

Figure 6:
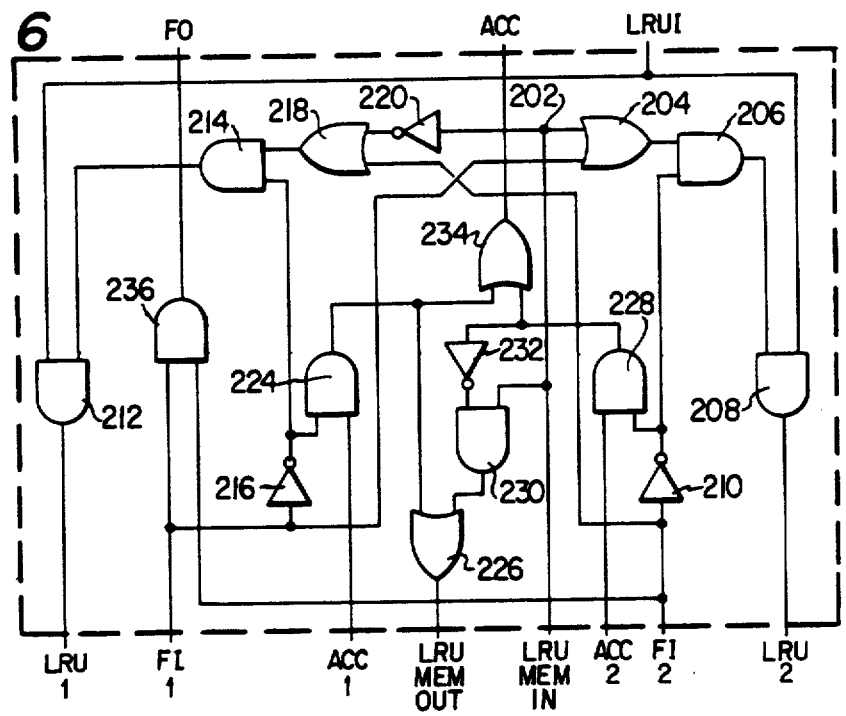
FIG. 6 illustrates a schematic diagram of one block of the LRU controller.

Referring now to FIG. 6, there is illustrated a schematic diagram of one of the controllers 190–194. The input labeled LRU MEM IN is connected to a node 202 and the state of the data applied thereto is either a logical "1" or a logical "0". For a logical "1", the circuit is steered in one direction to indicate that one branch is the least recently used device and for a logical "0", the circuit is steered in the opposite direction to indicate the other branch as being the least recently used branch. An OR gate 204 has one input thereof connected to the node 202 and the other input thereof connected to the fault input which, for illustrative purposes, is labeled FI1. The output of the OR gate 204 is connected to one input of an AND gate 206, the output of which is connected to one input of an AND gate 208. The other input of the AND gate 206 is connected to the other fault input FI2 through an inverter 210. The AND gate 208 has the output thereof connected to the output labeled LRU2 which is connected to the lines 182 labeled WE. The other input of the AND gate 208 is connected to the LRU input from the higher level control circuit which is labeled LRUI.

The AND gate 208 is operable to activate the LRU2 line when both a signal is received from the LRUI input and the output of the AND gate 206. This condition results from the higher level control circuit selecting the branch as a least recently used branch in addition to the data bit received from the LRU memory 176 being at the proper logic state which, in this mode is a logic "1". A logic "1" on the input to the OR gate 204 in addition to a logic "1" output by the inverter 210 causes the AND gate 206 to output a logic "1" to the input of the AND gate 208. When a logic "1" is input on the LRUI input, the LRU2 output is activated.

The other LRU output labeled LRU1 is connected to the output of an AND gate 212 which has one input thereof connected to the LRUI signal and the other input thereof connected to the output of an AND gate 214. The AND gate 214 has one input thereof connected to the other fault signal labeled FI1 through an inverter 216 and the other input thereof connected to the output of an OR gate 218. One input of the OR gate 218 is connected to the node 202 through an inverter 220 and the other input thereof is connected to the other fault signal FI2. In order for the AND gate 212 to be activated, the data bit received from the LRU memory 176 must be a logic "0", resulting a logic "1" output from the inverter 220.

In order for the data stored in the LRU memory 176 to steer the LRU signal to either the LRU1 output or the LRU2 output, the fault inputs FI1 and FI2 must be a logic "0". If, however, a fault is stored in the fault memory 184 corresponding to a given branch, this fault signal biases the LRU signal to the opposite side of the control circuit. For example, if a fault exists on the cache memory controlled by the LRU1 signal, a logic "1" signal is input to the FI1 input. This places a logic "1" on the output of the OR gate 204 and a logic "0" on the output of the inverter 216. This inhibits the AND gate 212 to prevent an LRU1 signal from being present and biases the AND gate 208 such that only an LRUI signal is necessary to activate the LRU2 input.

The access signal associated with the LRU1 signal is labeled ACC1 and this is connected to the input of an AND gate 224, the other input of which is connected to the output of the inverter 216. The output of the AND gate 224 is connected to one input of an OR gate 226, the output of which is connected to the LRU MEM OUT terminal of the control circuit. The other access signal associated with the LRU2 output is connected to one input of an AND gate 228, the other input of which is connected to the output of the inverter 210. The output of the AND gate 228 is connected to one input of an AND gate 230 through an inverter 232. The other input of the AND gate 230 is connected to the LRU MEM IN input and the output of the AND gate 230 is connected to the other input of the OR gate 226. The outputs of the AND gates 224 and 228 are connected to respective inputs of an OR gate 234, which has the output thereof connected to the output access signal from the control circuit labeled ACC.

In operation, an access signal on either the ACC1 or ACC2 input activates the respective AND gate 224 or 228 when the fault signals on the FI1 and FI2 are at a logic "0". If ACC1 is activated, the output of the OR gate 226 is at a logic "high". If the ACC2 input is activated and the fault signal FI2 is a logic "0", the AND gate 228 is activated to place a logic "0" on the output of the inverter 232, resulting in a logic "0" on the LRU MEM OUT output. It should be understood that only one access signal can be present on the ACC1 or ACC2 and both inputs will not be activated at the same time.

When neither ACC1 nor ACC2 is activated, the outputs of the AND gates 224 and 228 are at a logic "0". This results in a logic "0" being input to one input of the OR gate 226 from the AND gate 224 and a logic "1" input to the AND gate 230 from the inverter 232. The AND gate 230 has the other input thereof connected to the LRU MEM IN input such that a logic "0" thereon results in a logic "0" output from the AND gate 230. A logic "1" input thereon results in a logic "1" on the output of the AND gate 230 when no ACC2 signal is present.

The presence of an access signal will change the state of the memory bit to steer the circuit to the cache memory on the opposite branch. For example, if the LRU MEM IN input is at a logic "0", the LRU1 signal is activated, thus indicating that this is the least recently used of the two branches. If the branch associated with the ACC1 signal is activated, the LRU MEM OUT output must change to a logic "1". This bit is then stored in the LRU memory 176. This effectively biases the controller toward the LRU2 output, depending upon the state of the LRUI input from the higher level control circuits. If, on the next access, the branch associated with the LRU2 input is accessed, the ACC2 signal is activated, thus placing a logic "0" on the output of the inverter 232. This causes the output of the OR gate 226 to be a logic "0" to bias the control circuit toward the LRU1 output.

The fault signals FI1 and FI2 are both input to an AND gate 236, the output of which is connected to the FO output. This output is input to one branch of the higher level control circuit. As described above, the presence of a fault overrides the data bit stored in the LRU memory 176 to always bias the LRU signal to the opposite branch of the given controller. In this manner, the branch having the fault associated therewith will always appear to be the last accessed branch of the two, thereby preventing writing of data to that branch.

In summary, there has been provided a cache memory which is directly addressable with either a virtual or a physical address. A hierarchical tree structure is utilized to determine the least recently used memory location in an N-way associative set by utilizing N-1 bits of stored memory. The LRU algorithm is based upon a stored memory bit indicating which device is the least recently used bit and also upon a fault bit which prevents a faulty memory location from being designated as a least recently used memory location, thus preventing writing of data thereto.

Although the present embodiment has been described in detail, it should be understood that various changes, alterations and substitutions can be made therein without departing from the spirit and scope of the invention as defined by the appended claims.

What is claimed is:

1. A cache memory system having, in combination:
   (a) a bus for receiving an address for desired data, said address having a plurality of bits including a least significant bit portion comprised of a predetermined number of least significant bits and a most significant bit portion comprised of the remaining or most significant bits, the least significant bit portion of said address being common for all corresponding virtual addressed and physical addressed data, (b) a data memory for storing system data, a switching element for transferring data from the data memory, (c) a tag memory having a virtual tag memory portion for storing the most significant bit portions of said virtual addresses associated with said stored data and a physical tag memory portion for storing the most significant bit portions of said physical addresses associated with said stored data, said stored virtual and physical most significant bit portions are addressed by the least significant bit portion of said received address for output from said tag memory when said received least significant bit portion corresponds to the least significant bit portion of the said address associated with data stored in said data memory;

(d) address select means for selecting said stored virtual most significant bit portion when said received address is virtual and said stored physical most significant bit portion when said received address is physical; and (e) a comparison circuit responsive to said address select means for comparing said selected most significant bit portion to the most significant bit portion of said received address and providing an output to control said switching element for transfer of said selected data from said data memory.

2. The cache memory system of claim 1, and further comprising means for storing updated data in said data memory, the least significant bit portion of said updated data determining the address location in said data memory for storing said updated data; and means for storing the most significant bit portion of the associated physical and virtual address of said updated data in an address location in said tag memory determined by the least significant bit portion of the associated address of said updated data.

3. The cache memory of claim 1, wherein the least significant bit portion of the virtual and physical address associated with data is divided into first and second portions and said tag memory is divided into blocks of data, said first portion defining the address location of said blocks of data and said second portion defining the location of data within each of said blocks, said first portion of the least significant bit portion of the data address defining the location of said virtual and physical most significant bit portions of said stored data in said tag memory means.

4. The cache memory of claim 1, wherein said tag memory comprises first and second memory portions, each connected to the least significant bit portion of said bus and having a plurality of memory locations therein, each addressable by the least significant bit portion of said received address such that data is output from each of said first and second memory portions for a given least significant bit portion of said received address, said first memory portion storing most significant bit portions of the virtual address associated with data stored in said data memory and said second memory portion storing the most significant bit portion of the physical address associated with data stored in said data memory, addressing of said first and second memory portions simultaneously outputting the virtual and physical most significant bit portions of data corresponding to the least significant bit portion of the said received address.

5. A cache memory system having a bus for receiving an address for desired data, said address having a least significant bit portion comprised of a predetermined number of least significant bits and a most significant bit portion comprised of the remaining or most significant bits, the least significant bit portion of said address being common for all addressed data, a data memory for storing system data, and a switching element for transferring data from the data memory, further comprising:

a tag memory for storing the most significant bit portions of both virtual and physical addresses associated with said stored data, said stored virtual and physical most significant bit portions addressable by the least significant bit portion of said received address for output from said tag memory when said received least significant bit portion corresponds to the least significant bit portion of the said address associated with data stored in said data memory;

address select means for selecting said stored virtual most significant bit portion if said received address is virtual and said stored physical most significant bit portion if said received address is physical; and a comparison circuit responsive to said address select means for comparing said selected most significant bit portion to the most significant bit portion of said received address and providing an output to control said switching element for transfer of said selected data from said data memory;

wherein said address select means comprises:

an arbitration unit for receiving said address from said bus and determining whether said address is a virtual address or a physical address, said arbitration unit providing a control signal which identifies whether said received address is a virtual or physical address; and a multiplex switch interfaced with the output of said tag memory for selecting between said virtual most significant bit portion and said physical most significant bit portion output by said tag memory said multiplex switch controlled by said control signal from said arbitration unit to output said virtual most significant bit portion if said received address is virtual and said physical most significant bit portion if said received address is physical, the output of said multiplex switch being connected with the input of said comparator.

6. A cache memory system having a bus for receiving an address for desired data, said address having a least significant bit portion comprised of a predetermined number of least significant bits and a most significant bit portion comprised of the remaining or most significant bits, the least significant bit portion of said address being common for all addressed data, a data memory for storing system data, and a switching element for transferring data from the data memory, further comprising:

a tag memory for storing the most significant bit portions of both virtual and physical addresses associated with said stored data, said stored virtual and physical most significant bit portions addressable by the least significant bit portion of said received address for output from said tag memory when said received least significant bit portion corresponds to the least significant bit portion of the said address associated with data stored in said data memory;

address select means for selecting said stored virtual most significant bit portion if said received address is virtual and said stored physical most significant bit portion if said received address is physical; and a comparison circuit responsive to said address select means for comparing said selected most significant bit portion to the most significant bit portion of said received address and providing an output to control said switching element for transfer of said selected data from said data memory;

wherein said comparison means comprises an exclusive OR circuit for receiving the most significant bit portion of said received address and the most significant bit portion output by said address select means, the output of said exclusive OR circuit controlling said switch means when the most significant bit portion of said received address is identical to the most significant bit portion selected by said address select means.

7. A cache memory system having a bus for receiving an address for desired data, said address having a least significant bit portion comprised of a predetermined number of least significant bits and a most significant bit portion comprised of the remaining or most significant bits, the least significant bit portion of said address being common for all addressed data, a data memory for storing system data, and a switching element for transferring data from the data memory, further comprising:

(a) a tag memory for storing the most significant bit portions of both virtual and physical addresses associated with said stored data, said stored virtual and physical most significant bit portions addressable by the least significant bit portion of said received address for output from said tag memory when said received least significant bit portion corresponds to the least significant bit portion of the said address associated with data stored in said data memory;

(b) address select means comprising an arbitration unit for receiving said address from said bus and determining whether said address is a virtual address or a physical address, said arbitration unit providing a control signal which identifies whether said received address is a virtual or physical address for selecting said stored virtual most significant bit portion if said received address is virtual and said stored physical most significant bit portion if said received address is physical; and (c) a comparison circuit responsive to said address select means for comparing said selected most significant bit portion to the most significant bit portion of said received address and providing an output to control said switching element for transfer of said selected data from said data memory.

8. A cache memory system having a bus for receiving an address for desired data, said address having a least significant bit portion comprised of a predetermined number of least significant bits and a most significant bit portion comprised of the remaining or most significant bits, the least significant bit portion of said address being common for all addressed data, a data memory for storing system data, and a switching element for transferring data from the data memory, further comprising:

(a) a tag memory for storing the most significant bit portions of both virtual and physical addresses associated with said stored data, said stored virtual and physical most significant bit portions addressable by the least significant bit portion of said received address for output from said tag memory when said received least significant bit portion corresponds to the least significant bit portion of the said address associated with data stored in said data memory;

(b) address select means comprising an arbitration unit for receiving said address from said bus and determining whether said address is a virtual address or a physical address, said arbitration unit providing a control signal which identifies whether said received address is a virtual or physical address for selecting said stored virtual most significant bit portion if said received address is virtual and said stored physical most significant bit portion if said received address is physical; and (c) a multiplex switch interfaced with the output of said tag memory for selecting between said virtual most significant bit portion and said physical most significant bit portion output by said tag memory said multiplex switch controlled by said control signal from said arbitration unit to output said virtual most significant bit portion if said received address is virtual and said physical most significant bit portion if said received address is physical.

9. A cache memory system having a bus for receiving an address for desired data, said address having a least significant bit portion comprised of a predetermined number of least significant bits and a most significant bit portion comprised of the remaining or most significant bits, the least significant bit portion of said address being common for all addressed data, a data memory for storing system data, and a switching element for transferring data from the data memory, further comprising: when said received least significant bit portion corresponds to the least significant bit portion of the said address associated with data stored in said data memory;

(b) address select means for selecting said stored virtual most significant bit portion if said received address is virtual and said stored physical most significant bit portion if said received address is physical; and (c) a comparison circuit comprising logic circuit responsive to said address select means for comparing said selected most significant bit portion to the most significant bit portion of said received address and providing an output to control said switching element for transfer of said selected data from said data memory, said comparison circuit means for receiving the most significant bit portion of said received address and the most significant bit portion output by said address select means, the output of said logic circuit means controlling said switch means when the most significant bit portion of said received address is identical to the most significant bit portion selected by said address select means responsive to said address select means for comparing said selected most significant bit portion to the most significant bit portion of said received address and providing an output to control said switching element for transfer of said selected data from said data memory.

* * * * *